(12) United States Patent
MacArthur

(10) Patent No.: US 10,634,932 B1
(45) Date of Patent: Apr. 28, 2020

(54) NOSE FREE GLASSES UTILITY

(71) Applicant: Scott MacArthur, Lake Forest, IL (US)

(72) Inventor: Scott MacArthur, Lake Forest, IL (US)

(73) Assignee: Scott MacArthur

( * ) Notice: Subject to any disclaimer, the term of this patent is extended or adjusted under 35 U.S.C. 154(b) by 0 days.

(21) Appl. No.: 16/193,041

(22) Filed: Nov. 16, 2018

(51) Int. Cl.
*G02C 3/02* (2006.01)
*A42B 1/24* (2006.01)
*A44B 18/00* (2006.01)

(52) U.S. Cl.
CPC ............... *G02C 3/02* (2013.01); *A42B 1/247* (2013.01); *A44B 18/0053* (2013.01)

(58) Field of Classification Search
CPC ........ G02C 3/02; A42B 1/247; A44B 18/0053
See application file for complete search history.

(56) References Cited

U.S. PATENT DOCUMENTS

| | | | | |
|---|---|---|---|---|
| 2,795,793 A * | 6/1957 | Sommers | ............... | G02C 11/12 2/13 |
| 4,498,615 A * | 2/1985 | Johnson | ............... | A63B 57/203 224/274 |
| 4,768,231 A * | 9/1988 | Schrack | ............... | A61F 9/045 2/13 |
| 4,885,808 A * | 12/1989 | Carpenter | ............... | A41D 20/00 2/452 |
| 5,056,164 A * | 10/1991 | Lisle | ............... | A42B 1/062 2/453 |
| 5,129,102 A * | 7/1992 | Solo | ............... | A42B 1/247 2/10 |
| 5,647,061 A * | 7/1997 | Marcus | ............... | G02C 3/02 2/11 |
| 5,987,640 A * | 11/1999 | Ryder | ............... | G02C 3/02 2/10 |
| 6,174,058 B1 * | 1/2001 | Hsiao | ............... | A42B 1/062 2/10 |
| 6,244,706 B1 * | 6/2001 | Maher | ............... | A42B 1/247 2/10 |
| 6,948,812 B2 * | 9/2005 | Wichner | ............... | A42B 1/247 2/10 |
| 7,207,673 B1 * | 4/2007 | Ho | ............... | A42B 1/247 2/10 |
| 10,455,880 B2 * | 10/2019 | Livingston | ............... | A42B 7/00 |
| 2007/0192933 A1 * | 8/2007 | Kam | ............... | A42B 1/247 2/171 |
| 2017/0020220 A1 * | 1/2017 | Plon | ............... | A42B 1/02 |

FOREIGN PATENT DOCUMENTS

WO          WO-8302011 A1 *  6/1983  ............... G02C 7/16

* cited by examiner

*Primary Examiner* — Kristen Matter

(57) ABSTRACT

A nose free glasses utility for eliminating the use of a nose to support glasses includes hook and loop fasteners adhered to a visor/brim of a hat which eliminates the need to use the bridge of a nose for support.

2 Claims, 6 Drawing Sheets

NOSE FREE GLASSES UTILITY

BACKGROUND OF THE INVENTION

1. Field of the Invention

The present invention is in the field of glasses and pertains particularly to glasses worn at the same time a user wears a hat with a visor/brim with loops.

2. Discussion of the State of the Art

When people wear glasses and hats with visors/brims, glasses typically rely and rest on the bridge of a user's nose. One problem is glasses create indentations on a wearer's nose and often irritate the skin.
Therefore, what is clearly needed is a nose free utility that solves the problem mentioned above.

SUMMARY OF THE INVENTION

In one embodiment of the invention a utility for eliminating the need to support glasses using the bridge of a wearer's nose is provided, comprising a utility with loops adhered to the underside of a visor/brim of a hat worn by the user.

DETAILED DESCRIPTION

The inventor provides a unique utility for keeping glasses or sunglasses completely off a wearer's nose. The invention is a head worn garment having a common bill/brim/visor with loops comprised of hook and loop fasteners. The present invention is described in enabling detail in the following examples, which may represent more than one embodiment of the present invention.

Figure 1:
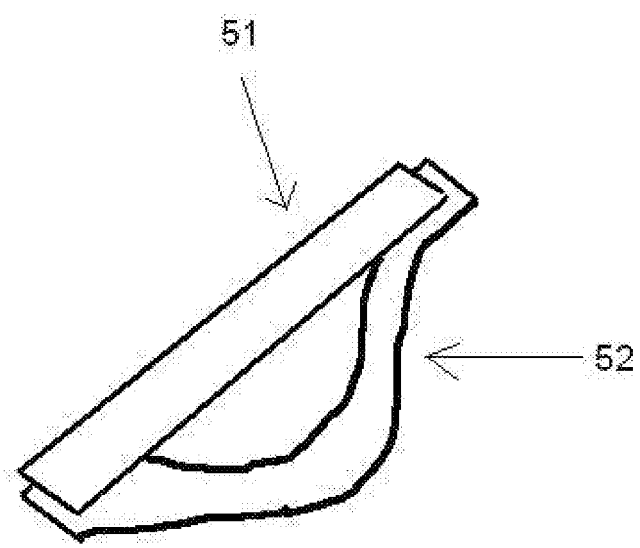
FIG. 1 is a view of a section of the invention.

FIG. 1 is a view of a section of the invention. This section consists of 1 hook fastener (51) and 1 loop fastener (52). The hook fastener is 1½ inch length by ¼ inch width. The loop fastener is 2 inch length by ¼ inch width. The hook and loop fasteners are material made from bendable/pliable fabric/rubber-like plastic. In use, two sets of this section of the invention are needed. The hook fasteners are adhered to the underside of the visor of the head worn garment, near the outer edge of the left and right sides of the visor, lengthwise from the back of the wearer's head to the front (not side to side). Each hook fastener is adhered to the right and left sides of the underside of the visor approximately ¼ inch from the point where the visor meets the panels/cap portion of the invention. The loop fasteners are connected to the hook fasteners in a bell curve manner, with each end being releasably affixed to the hook fasteners.

Figure 2:
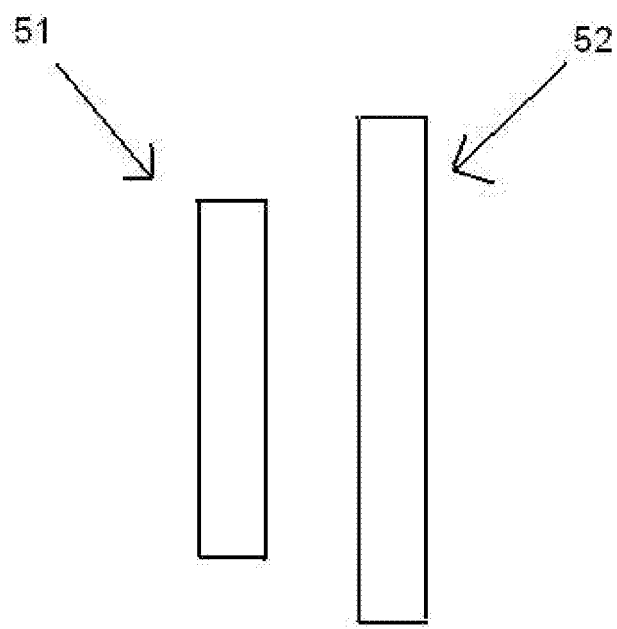
FIG. 2 is a view of a disassembled section of the invention.

FIG. 2 is a view of a disassembled section of the invention illustrating the difference in size between the hook fastener (51) and the loop fastener (52). The loop fastener is longer in order to form a bell-shaped curve needed to support the arms of glasses.

Figure 3:
FIG. 3 is a side view of the invention in use.

FIG. 3 is a side view of the invention in use. Temples of glasses or sunglasses are inserted through the loop created by the invention. In normal usage, arms/temples of glasses or sunglasses are inserted through the loop from the inside of the bill and slide to the outside of the hat ending above the user's ears. This normal usage prevents glasses from tumbling forward because the natural outward pressure of arms of glasses helps to secure glasses in place. The darkened areas of the drawing are darkened for the sole purpose of demonstrating the location of the hook and loop fasteners.

Figure 4:
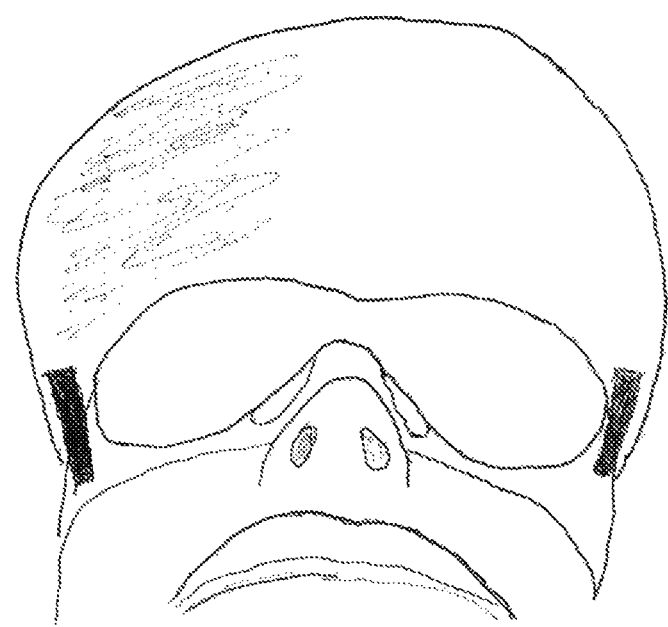
FIG. 4 is an underside view of the invention in use.

FIG. 4 is an underside view of the invention in use. Note that glasses are not touching the wearer's nose.

Figure 5:
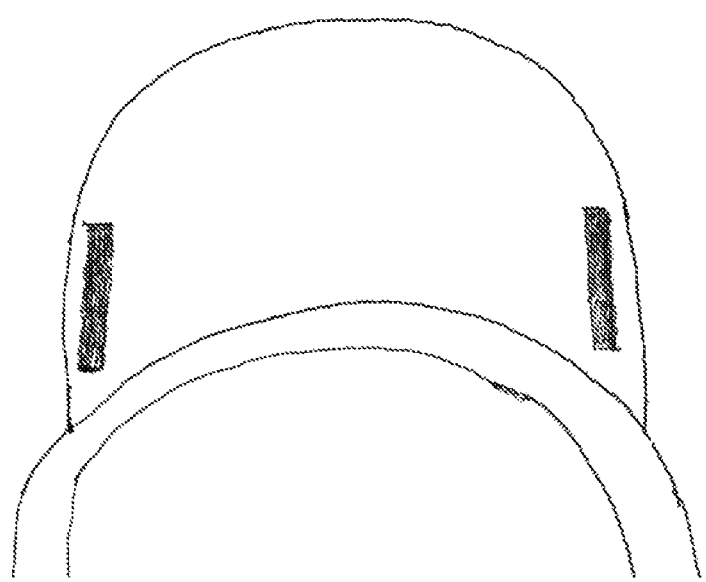
FIG. 5 is an underside view of the invention where hook fastener parts of the invention are located.

FIG. 5 is an underside view of the hook fasteners that were previously introduced in FIG. 1, attached to the underside of the hat.

Figure 6:
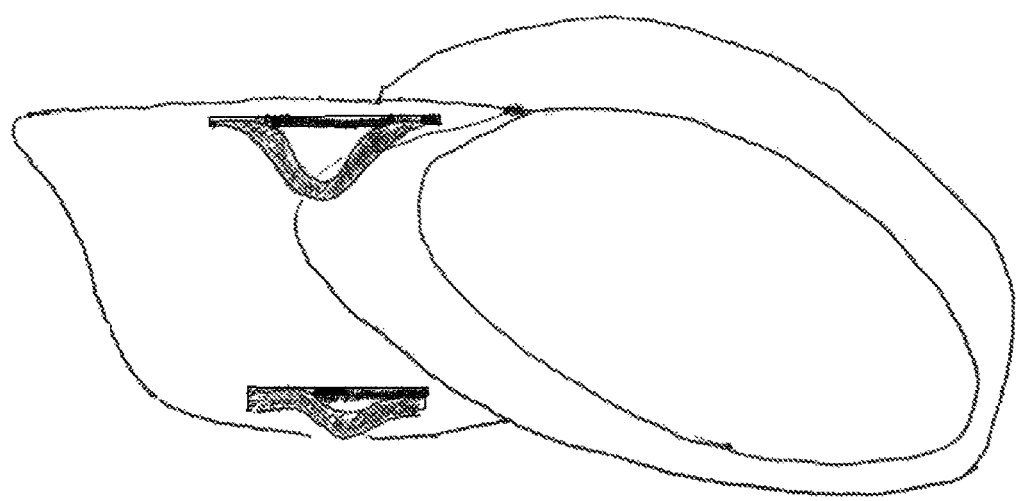
FIG. 6 is a view of the invention.

FIG. 6 is a view of the invention and shows where the loop fasteners that were previously introduced in FIG. 1 are connected to the hook fasteners.

It will be apparent to one with skill in the art or to a person of ordinary skill that the nose free glasses utility of the invention may be provided using some or all of the mentioned features and components without departing from the spirit and scope of the present invention. It will also be apparent to the skilled artisan or person of ordinary skill that the embodiments described above are specific examples of a single broader invention which may have greater scope than any of the singular descriptions taught. There may be many alternatives made in the descriptions without departing from the spirit and scope of the present invention.

I claim:

1. A garment for wearing on a head of a user, the garment comprising:
   a brim or visor having a left side and a right side;
   two elongated hook fastener strips adhered to an underside of the brim or visor lengthwise from a back of the brim or visor to a front of the brim or visor, one of the two hook fastener strips being located on the left side of the brim or visor and the other of the two hook fastener strips being located on the right side of the brim or visor; and
   two elongated loop fastener strips, one of the loop fastener strips releasably secured to one of the hook fastener strips on the left side of the brim or visor and the other of the loop fastener strips releasably secured to the other hook fastener strip on the right side of the brim or visor;
   wherein the loop fastener strips form a bell curve shape when secured to the hook fastener strips configured to pass arms of eyeglasses through in order to selectively secure the eyeglasses to the brim or visor thereby supporting the eyeglasses in front of the eyes of the user without requiring a bridge of a nose for support.

2. The garment of claim 1, wherein each hook fastener strip is approximately 1.5 inches in length and each loop fastener strip is approximately 2 inches in length.

* * * * *